Oct. 16, 1962

E. R. DOAK 3,058,693

MEANS TO SUPPLEMENT THE NORMAL THRUST OF
A HIGH SPEED AIRCRAFT AT LOW SPEED

Filed Feb. 2, 1960

INVENTOR.
EDMOND R. DOAK
BY
Miketta and Glenny
ATTORNEYS.

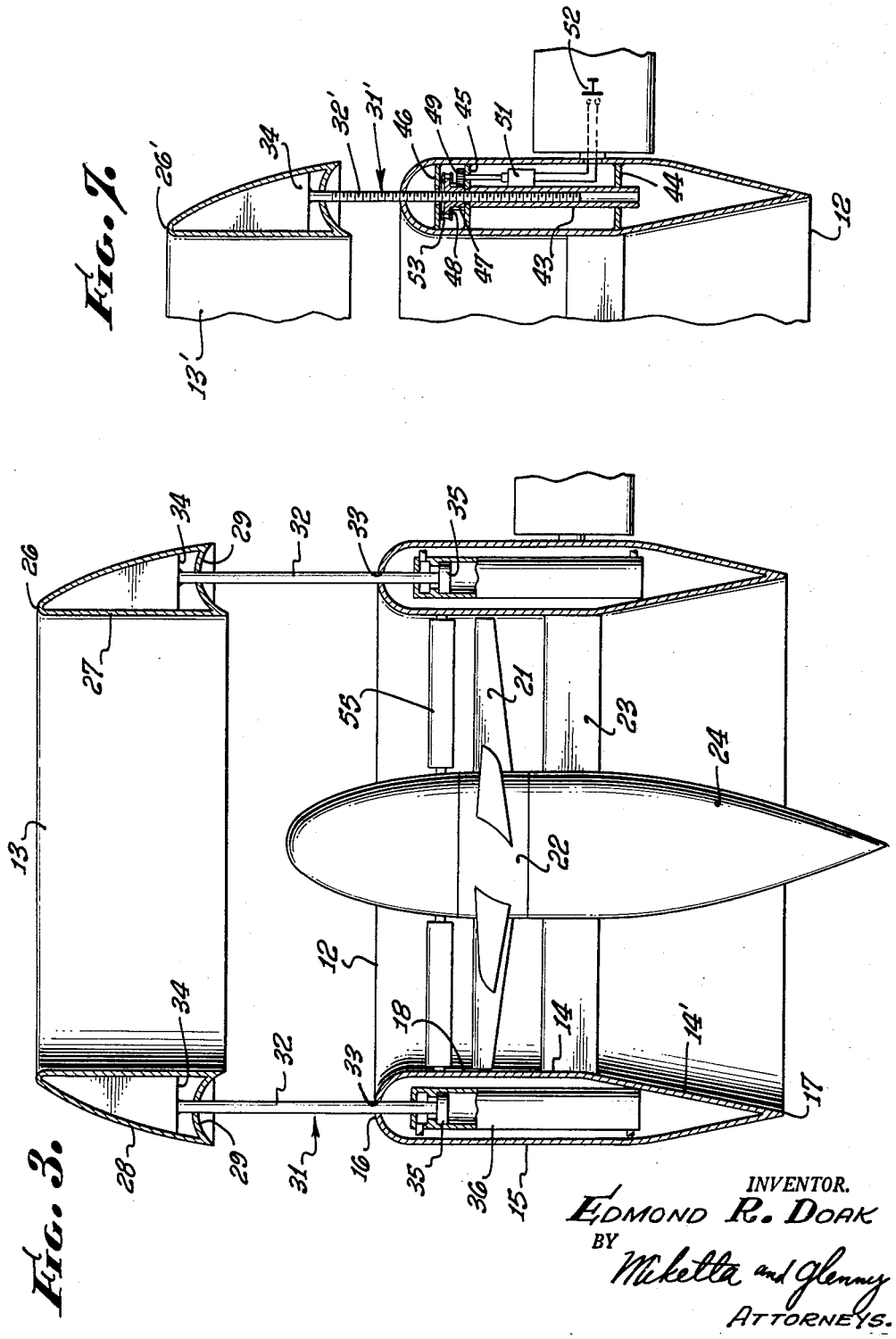

Oct. 16, 1962
E. R. DOAK
3,058,693
MEANS TO SUPPLEMENT THE NORMAL THRUST OF
A HIGH SPEED AIRCRAFT AT LOW SPEED
Filed Feb. 2, 1960
3 Sheets-Sheet 3
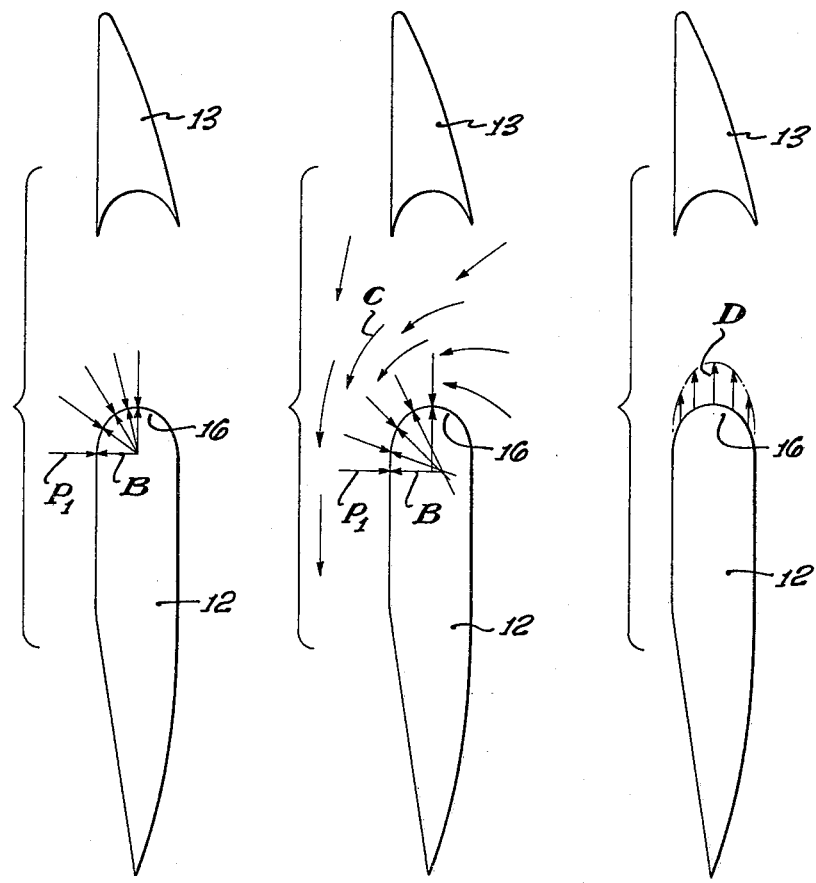
EDMOND R. DOAK
INVENTOR.
BY Miketta and Glenny
ATTORNEYS.

United States Patent Office 3,058,693
Patented Oct. 16, 1962

3,058,693
MEANS TO SUPPLEMENT THE NORMAL THRUST OF A HIGH SPEED AIRCRAFT AT LOW SPEED
Edmond R. Doak, 1066 Stearns Drive, Los Angeles, Calif.
Filed Feb. 2, 1960, Ser. No. 6,235
9 Claims. (Cl. 244—23)

This invention relates to improvements in ducted components, and particularly to improvements in the aerodynamic properties of such ducted components to obtain the most desirable results at widely divergent conditions of flight, ranging from high speed to low speed or a hovering condition.

It has heretofore been disclosed and demonstrated that an aircraft can be caused to rise vertically and hover when provided with a thrust-producing element or elements comprising a duct having a driven bladed impeller in such duct (the tips of the impeller blades being in close proximity to the inner surface of such duct) and the forward or intake surface portion being gradually convexly curved into confluent relation to the inner surface of the duct proper.

The effective thrust generated by such arrangement is due, in large part, by the flow of air (generated by the impellers) over the curved intake surfaces, such flow producing a negative pressure adjacent such forwardly directed surfaces (such negative pressure may be termed static thrust) in combination or total with the positive axial thrust generated by the air ejected from the rear or discharge end of the duct. Exemplary arrangements of this type appear in application Serial No. 505,377, filed May 2, 1955, now Patent No. 2,948,111, by Norman E. Nelson.

When such ducted propulsion units are used (either with a bladed impeller or other air-flow producing thrust generating means in the duct) the aircraft can move through the air only at a limited or reduced speed (or ground speed). This is due to the presence of the rounded, gradually curving convex, frontal surfaces adjacent the intake of the duct. What was a useful negative pressure on such surfaces at low speeds becomes an opposing positive pressure at high speeds which actually reduces the total thrust effective to cause movement through the air. When these frontal surfaces are changed to present a sharp leading edge area (as in high speed airfoils), then the desired negative pressures (or static thrust) are not obtained and vertical take-off and hovering characteristics are greatly impaired and may be lost under certain borderline conditions.

The present invention is directed to means for permitting a craft (or thrust-producing unit) capable of vertical take-off and hovering, to also attain high forward speeds. Conversely stated, the invention may be said to relate to an aircraft, capable of forward flight at high speed, provided with means for permitting and implementing flight conditions encountered during vertical take off, hovering and low forward speed. In general, the present invention provides an open-ended duct having a frontal surface of relatively blunt contour and thrust-generating means axially located within said duct. An annular extension is carried by the duct and has a relatively sharp leading edge. Selectively operable means are provided for axially moving the annular extension from a position adjacent the duct to a position wherein the annular extension is spaced forwardly from said duct.

When the annular extension is adjacent the duct or inlet surface, a streamlined airfoil surface is provided which has minimum drag at high forward speed. However, when the extension is moved axially forward and is spaced from the duct or inlet surface, the incoming air is drawn over the blunt frontal surface of the duct to produce an increase in static thrust by the duct surface and thereby supplement the thrust produced by the thrust-generating means within the open-ended duct.

While there may be other applications for the present invention, it is preferred that this type of a duct and annular extension be rotatably carried at the lateral extremeties of the wings of a vertical take-off aircraft. When the ducts are in the vertical position, thrust created from within the ducts causes the aircraft to rise vertically. When the aircraft is airborne, the ducts can be rotated 90° into the horizontal position and the aircraft is then capable of normal, high speed, horizontal flight. This type of vertical take-off aircraft is described by Edmond R. Doak in application Serial No. 472,313, filed December 1, 1954, now abandoned.

An object of the present invention is to provide selectively movable means for streamlining the frontal portion of an aerodynamic surface at high speed for minimum drag and for exposing the blunt frontal portion of the surface at low speed or a hovering condition to produce an increase in axial static thrust.

Another object of the invention is the provision of means for improving an aerodynamic surface to obtain the most desirable results at high and low speeds.

A further object is the provision of an open-ended duct having a blunt frontal portion and thrust-generating means within the duct and an annular movable extension carried by the duct whereby the extension can be adjacent the duct to provide a streamlined airfoil for high speed flight conditions or moved to a position spaced from the duct, to reduce the static pressure of the fluid adjacent the blunt frontal portion whereby static thrust of the surface is increased.

Other objects and advantages of this invention will be readily apparent from the following description when considered in connection with the appended drawings.

In the drawings:

FIG. 3 is a sectional view through a ducted-thrust unit with the annular extension spaced from the frontal portion of the duct when the unit is in the vertical position for hovering or vertical take-off.

FIG. 4 is a diagrammatic representation of the pressures acting on the frontal surface of the duct when the duct is in the vertical position or static condition, the annular extension is spaced from the duct and the incoming fluid has substantially zero velocity.

FIG. 5 is a diagrammatic view similar to FIG. 4 where the incoming fluid C has a certain velocity and the static pressure $P_1$ has decreased while the negative pressure B of the duct surface has increased.

FIG. 6 is similar to FIGS. 4 and 5 and shows the effective axial components D of the resulting negative forces B after the static pressures $P_1$ have been subtracted. The effective axial components D are the static thrust which is produced and supplements the normal thrust of the ducted unit.

FIG. 7 is a modification of the ducted-thrust unit where the inlet of the annular extension is restricted and a screw and sprocket arrangement is utilized for selectively moving the annular extension.

To thoroughly understand the term "static thrust" as used in connection with the present invention, it is desirable to make use of various principles and scientific laws and formulae. And without being limited thereto, these principles will be compared and explained in connection with a vertical take-off aircraft having rotatable thrust units carried at the lateral extremities of its wings, this type of aircraft being shown in FIG. 1.

Figure 1:
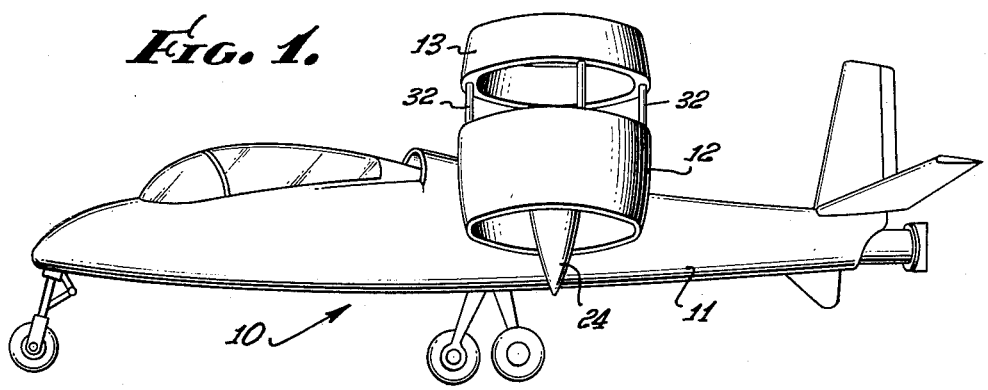
FIG. 1 shows a perspective view of a vertical take-off aircraft when the ducted-thrust units are in the vertical position for hovering or in the static condition.

Static thrust can be best understood when the aircraft and its ducted fan units have no forward speed as in the vertical or hovering condition (FIG. 1). This may be described as having the aircraft in a "static condition." From this condition, the intention is to develop sufficient "static thrust" to supplement the thrust being produced from the propellers to lift the aircraft off the ground and rise vertically.

When the thrust-generating means (fan or impeller) within the ducts is stationary or rotating at a very low speed, there is a total fluid pressure acting on the surfaces of the duct. This total pressure can be designated as $P_2$ and equals the static pressure at the surface of the duct plus the dynamic pressure.

$$P_2 \quad = \quad P_1 \quad + \quad \frac{1}{2}\rho V_1 2$$

(total pressure) (static pressure) (dynamic pressure)

The dynamic pressure is equal to $\frac{1}{2}\rho V_1 2$ where $\rho$ is the density of the fluid and $V_1$ is the velocity of fluid. In the "static condition," when the impeller is stationary, the fluid velocity ($V_1$) is zero and there is no dynamic pressure. Therefore, the total pressure $P_2$ of the fluid is equal to its static pressure $P_1$.

Use is now made of Newton's third law of nature where every force results from the interaction of two bodies. The two bodies experience equal forces, but in opposite directions. The two bodies here are the fluid and the duct surface. This then means that at each point on the surface of the duct there is an equal and opposite pressure being exerted by the surface of the duct against the "total pressure" $P_2$.

When the thrust-generating means is rotated or its rotation is increased and incoming fluid is drawn into the duct and over the surfaces of the duct with a given velocity $V_1$, the "static pressure" $P_1$ of said fluid is reduced in accordance with the well known Bernoulli's theorem that has been applied to venturi nozzles and the like. However, when the fluid is given a velocity $V_1$ and placed into motion, the total pressure $P_2$ is still equal to the static pressure ($P_1$) plus the dynamic pressure ($\frac{1}{2}\rho V_1 2$).

The "static pressure" ($P_1$) of the moving fluid at a point on the surface of the duct or within the fluid can be formally defined as the mean of the normal components of stress on three mutually-perpendicular elements of the surface at that point, at rest relative to the fluid. Therefore, there is "static pressure" at each point along the surface of the duct and at each of said points there is still an opposite pressure B being exerted by the surface of the duct which balanced the total pressure ($P_2$) of the fluid exerted on each point when the fluid was motionless. This opposite force B can be referred to as "negative pressure."

For simplicity, the discussion is limited to a single point along the surface of the duct. There is static pressure ($P_1$) being exerted inwardly on the surface of the duct at this point and there is a "negative pressure" (B) being exerted outwardly at this point by the surface. Since static pressure acts perpendicular to the laminar flow path of the fluid, it is acting perpendicular to the surface of the duct at this point.

Since the velocity ($V_1$) of the fluid has increased, it can be seen from the basic formula, $(P_2 = P_1 + \frac{1}{2}\rho V_1 2)$ that to have a constant total pressure ($P_2$), the static pressure ($P_1$) decreased. Therefore, at each point on the surface of the duct, there is a greater "negative pressure" (B) being exerted outwardly than there is static pressure being exerted inwardly. The pressures are unbalanced and therefore there is a tendency of motion.

The axial components of the increased or greater "negative pressure" produce the effective force for obtaining or having a tendency to obtain motion for the duct and are the "static thrust" referred to in this invention. The greater the surface area of the duct, the greater the number of points, and the greater the "static thrust" which will be produced. The static thrust (D) has a tendency to move the aircraft in an upward direction as shown in FIG. 6. This is in distinction to the normal action and reaction that occurs from thrust produced by the fan or impeller within the duct. There the aircraft has a tendency of motion in the upward (or forward) direction in response to the reaction of the thrust being produced in a downward (or rearward) direction.

It can therefore be understood that the force and direction of the "static thrust" will depend on several factors such as the area of the surface and its orientation with respect to the direction of air flow. It follows that by properly orienting a surface having a large surface area adjacent a high velocity airstream, it is possible to develop substantial static thrust in a direction supplemental to the thrust developed by a propulsion unit in an aircraft. Under high speed flight conditions, however, such orientation would undoubtedly produce excessive drag on the surface and consequently, resistance to forward movement of the aircraft. For this reason, the concept of static thrust as a propulsive supplement has generally been rejected in the design of modern high speed aircraft. The present invention completely obviates this problem and now the supplemental use of static thrust at low speeds can be utilized on high speed aircraft.

In the exemplary device illustrated, the invention is particularly related to the thrust propulsion unit of a vertical take-off aircraft (FIG. 1) in which the thrust generating means is provided within the throat of the propulsion unit. While the invention is applicable to any such ducted propulsion unit, it is particularly applicable to an open-ended tubular duct having a wall of air-foil configuration in section, and a multibladed fan or impeller mounted in the duct for rotation about an axis coincidential with the axis of the duct. Such thrust propeller units may be carried by the lateral extremities of the wings and be provided with means for partially rotating each unit about an axis transverse to the longitudinal axis of the aircraft, thereby permitting the aircraft to become airborne in a virtually vertical manner and to fly at high speed in a horizontal manner after being airborne. The present invention is, however, not directed to details of construction of any particular propulsion unit, and therefore the details of such units are not described but are indicated in the drawings as exemplary of various constructions and designs which may be employed.

In FIG. 1, it can be seen that a thrust propulsion unit 10 may be rotatably carried at the lateral extremity of a wing of a vertical take-off aircraft 11, it being understood that a like unit is carried at the extremity of the other wing of the aircraft 11. The unit 10 comprises an open-ended tubular duct 12 which carries an annular extension 13. In horizontal high speed flight, the annular extension 13 is adjacent the duct 12 (FIG. 2) to provide a streamline airfoil for minimum drag; but when the unit 10 is rotated into the vertical position (FIG. 3) or static condition, the annular extension is adapted to be moved upwardly and spaced from the duct whereby axial static thrust of the duct is increased.

The duct 12 comprises a wall or shroud of airfoil cross section presenting a smooth, inner, tubular surface 14 and an outer surface 15, these two surfaces merging to form a blunt frontal surface 16 and a trailing edge 17. The inner surface, in effect, converges to provide a throat 18 of smaller diameter than and spaced rearwardly from the frontal surface 16. The throat 18 may be located in a zone from about 20% to 60% of the total length of such duct from the frontal surface 16.

Thrust-generating means 21 is axially located within the duct 12 and preferably is a multibladed fan or propeller carried by a hub portion 22 mounted for rotation upon an axis coincidental with the axis of the duct. A spider or a series of spaced contravanes 23 attached to the trailing portion 24 of the hub and to the inner walls of the duct maintain the blade assembly in proper position within the duct.

The selectively movable annular extension 13 is carried by the duct 12 and has a relatively sharp leading edge 26 and inner and outer surfaces 27 and 28 extending rearwardly therefrom in diverging relation. The frontal surface 16 of the duct 12 may be convex and the annular extension may be provided with a concave surface 29 adapted to receive the frontal surface 16 of the duct in nesting relation when the extension is adjacent the duct. The chord length of the extension may be between 20% and 50% of the chord length of the duct.

It is preferred that the inner surface of the duct is virtually cylindrical, the inner surface of the annular extension is virtually cylindrical and the rearward portion 14' of the inner surface is outwardly and rearwardly inclined. However, the inlet or entrance of the extension 13 may be constructed so that when the extension is in the nested position with the duct, the inner surface of the extension diverges rearwardly and smoothly merges with the throat 18 of the duct to form a continuous inner diverging passageway for high speed flight conditions and minimum drag. FIG. 7 shows a restricted leading edge 26' for an extension 13'. One of the advantages of decreasing the internal diameter of the intake end of the duct (over the diameter in the propulsive thrust zone, or in the zone embracing the bladed impellers) is that the higher velocity of air flow at such intake end is reduced in the thrust zone, thereby reducing the load on the impellers in such zone.

The annular extension 13 may be carried on the duct 12 by selectively operable means 31 for axially moving the extension 13 from a position adjacent the duct 12 wherein the inner and outer surfaces 27 and 28 of the extension are in proximity to and virtually confluent with the inner and outer surfaces 14 and 15 of the duct for high forward speed flight conditions and minimum drag (FIG. 2) to a position (FIG. 3) wherein the annular extension is spaced forwardly from the duct, whereby axial static thrust of the duct is increased. The means 31 are preferably contained between the inner and outer surfaces of the duct and extension to minimize drag.

The selectively operable means 31 may comprise a plurality of circumferentially spaced, elongated rods 32 telescopingly received within the duct 12 through suitable openings 33 circumferentially spaced around the frontal surface 16. The outer ends of the rods are rigidly fixed to the extension 13 by various means, such as being welded or bolted to suitable ribs 34 provided between the inner and outer surfaces of the extension 13. The other end of each of the rods may have a piston 35 fixed thereon which is slidably received and controlled by a cylinder 36 carried in between the inner and outer surfaces of the duct 12. The cylinder is supplied pressurized fluid through inlets 37 and 38 to selectively retract and project the piston 35 and rod 32. A suitable two-way valve 41 and pump 42 (FIG. 2) are connected to the inlets or connections 37 and 38 for selectively controlling the fluid being pumped to the cylinder 36. Any number of rods 32 and cylinders 36 may be circumferentially carried by the duct for properly supporting the extension and moving it from adjacent the duct to a spaced, forward position. It is understood that all of the inlets 37 are interconnected as are inlets 38 so that all of the rods 32 are controlled by the single valve 41.

As shown in FIG. 7, other means 31' may be provided for selectively moving the extension 13 from adjacent the duct 12 to a spaced forward position. The means 31' may include an elongated, rigid screw 32' which acts in the same maner as rod 32. The outer end of the screw 32' is rigidly fixed to the rib 34 on the extension 13 and the other end of the screw 32' is received within an elongated guideway 43 which is carried between the surfaces of the duct by transverse ribs 44, 45 and 46. A nut 47 is journalled between ribs 45 and 46 and receives the elongated screw 32'. While the nut is prevented from axial movement by ribs 45 and 46, rotational movement of the nut 47 causes the screw 32' to move in and out of the duct to control the position of the extension 13'.

A sprocket 48 is keyed to the nut 47 for rotational movement therewith. The nut 47 and sprocket 48 are selectively rotated by means of a small pinion gear 49 which meshes with outer gear teeth provided on the nut 47. The gear 49 may be selectively driven by a small motor 51 which is controlled by a switch 52. It being understood that there may be provided any number of elongated screws 32', nuts 47 and sprockets 48 circumferentially within the duct for properly supporting and positioning the extension 13'. It is preferred that there only be a single motor 51 and a chain 53 interconnecting the sprockets and nuts circumferentially located in the duct. Rotation of the pinion gear 45 by the motor 51 will thus cause all of the sprockets and nuts to simultaneously rotate and move the screws 32'. It is preferred that the rear surface 29 of the extension in the spaced position (FIG. 3) be spaced from the frontal surface 16 a distance not less than the profile thickness of the duct 12 to prevent turbulence from acting on surface 16.

The inlet end of the duct 12 of the vertical take-off aircraft 11 may be provided with a plurality of radially extending inlet guide vanes 55 pivotably mounted between the inner surface 14 and the forward portion of the hub and spaced forwardly of the multi-bladed fan 21. The vanes 55 are rotated to control the direction of the incoming air on the blades of the fan 21 and thus can be utilized in regulating the thrust produced by the fan 21. The control system for the vanes 55 forms no part of the present invention and therefore is not disclosed here but is described in application Serial No. 798,779, filed March 11, 1959, now Patent No. 2,974,900, by Morris et al.

The operation of the annular extension 13 in increasing the thrust of the propulsion unit 10 under static flight conditions is as follows:

Assuming a vertical take-off aircraft 11 preparing to take off vertically, where maximum thrust is desired from a propulsion unit 10, the pilot will rotate the units 10 into a vertical position (FIG. 3) and rotate valve 41, allowing compressed fluid to enter cylinders 36 and move the annular extension 13 from a position adjacent the duct 12 (FIG. 2) to a spaced forward position (FIG. 3). As a result, the blunt frontal surface 16 of the duct is exposed to the incoming air. This condition is represented diagrammatically in FIG. 4 where the velocity of the fluid is zero and the total pressure of the fluid is equal to the static pressure ($P_1$) which is opposed by an equal negative pressure (B) of the duct surface.

As the propeller 21 is rotated and its speed increased to a take-off point, high velocity air rushes through the duct 12, through the space between the extension 13 and duct 12, and over the frontal surface 16. This flow of air through the duct is represented diagrammatically in FIG. 5 by arrows C. As will be apparent to one skilled in the art, the velocity ($V_1$) of the air stream is considerably increased as it passes through the throat 18 of the duct. And as a result, the static pressure $P_1$ in FIG. 5 adjacent the surface 16 is greatly reduced causing a corresponding increase in the negative pressure B of the surface 16. The effective axial component D of the resultant pressure after $P_1$ is subtracted from B is shown in FIG. 6 and represents the effective static thrust which supplements the thrust produced by the propeller 21.

Figure 2:
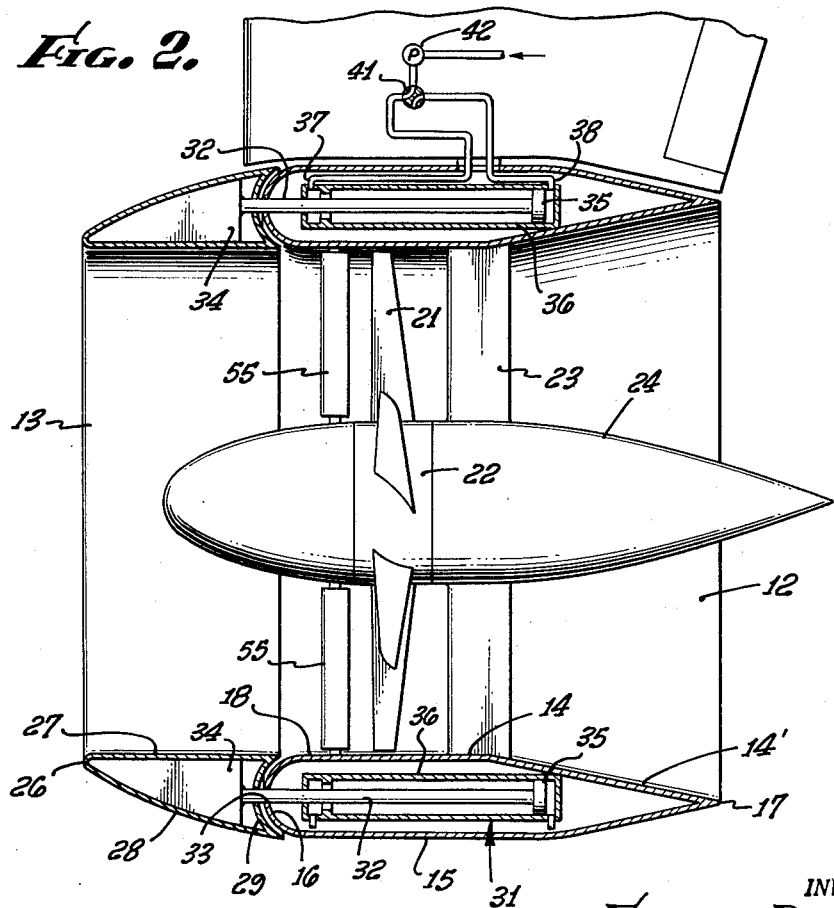
FIG. 2 is a longitudinal sectional view of a ducted-thrust unit in FIG. 1 when the unit is in the horizontal position for high speed flight.

It will be apparent therefore that as the aircraft approaches the point of take-off, this added thrust will permit the take-off much more rapidly and with less thrust from the propeller than otherwise possible. After take-off has been accomplished and the aircraft is airborne, it may be desirable to fly horizontally at high speeds. The valve 41 is rotated so that the extension is moved rearwardly into a position adjacent the duct (FIG. 2). As a result, a streamlined airfoil is presented which allows a minimum of drag at high speeds.

From the above detailed description, it will be apparent that the present invention makes possible an airfoil configuration for the propulsion units of high speed aircraft that provides a minimum of drag under high speed flight conditions, yet which is capable of presenting a large, blunt frontal surface area of the duct and thereby achieve a unique increase in the components of static thrust axially of the propulsion unit. It is understood, that while the invention has been described above with the ducts in a vertical position, other positions for the ducts are possible and static thrust may still be obtained. For example, if instead of a vertical take-off, it may be desired to have the aircraft take off in a normal manner but using a shorter runway. The ducts can therefore be rotated into a position between horizontal and vertical or a 45° position, the extension can be moved forwardly, and the speed of the propeller increased to a take-off point. Static thrust will still be produced allowing the aircraft to take-off on a shorter runway than normally used. However, it is understood that the axial components of static thrust may not be as great as when the ducts are in the vertical position due to the positioning of the frontal surface 16 with respect to the incoming air in order to produce the maximum static pressure.

Obviously, many modifications and variations of the present invention are possible in the light of the above teachings. In one sense, the present invention can be considered as a means for selectively varying drag and static axial thrust of an aircraft's propulsion unit. It is therefore to be understood that within the scope of the appended claims the invention may be practiced otherwise than as specifically described.

I claim:

1. In an aircraft capable of forward flight at high speed, means for implementing flight conditions encountered during hovering, take-off and low, forward speed flight comprising: an open-ended duct having inner and outer surfaces and a frontal surface of relatively blunt contour, and thrust-generating means axially located within said duct; an annular extension carried by the duct, said annular extension having a relatively sharp leading edge and inner and outer surfaces extending rearwardly therefrom in diverging relation; and selectively operable means for axially moving said annular extension from a position adjacent said duct wherein the inner and outer surfaces of the extension are in proximity to and virtually confluent with the inner and outer surfaces of the duct for high forward speed flight conditions and minimum drag to a position wherein said annular extension is spaced forwardly from said duct, whereby axial static thrust of said duct is increased.

2. In an aircraft as stated in claim 1, the provision of a convex frontal surface on said duct.

3. An aircraft as stated in claim 1 wherein the chord length of said extension is between 20% and 50% of the cord length of said duct.

4. An aircraft as stated in claim 1 wherein the frontal surface of the duct is convex and the annular extension is provided with a concave surface adapted to receive the frontal surface of the duct in nesting relation when in said first position.

5. An aircraft as stated in claim 1 wherein said selectively operable means are contained between the inner and outer surfaces of said duct.

6. Means for selectively varying drag and static axial thrust of an aircraft propulsion unit comprising an open ended duct having inner and outer surfaces, a frontal convex surface and a thrust generating means axially located with said duct, comprising: an annular extension carried by such duct, said annular extension having a relatively sharp leading edge and inner and outer surfaces extending rearwardly therefrom in diverging relation, and a concave rear surface; and selectively operable means interconnecting said duct and annular extension for moving the latter axially from a position adjacent said duct wherein the rear portions of the inner and outer surface of the extension are virtually confluent with the inner and outer surfaces of the duct for high forward speed flight conditions to a position wherein the concave rear surface of the annular extension is spaced from the frontal surface of the duct a distance of not less than the profile thickness of said duct.

7. Means as stated in claim 6 wherein a forward portion of the inner surface of the duct is virtually cylindrical, the inner surface of the annular extension is virtually cylindrical and a rearward portion of the inner surface of the duct is outwardly and rearwardly inclined.

8. In an aircraft capable of forward flight at high speeds, means for implementing flight conditions encountered during hovering, take-off and low forward speed flight, comprising: an open-ended duct having inner and outer surfaces and a frontal surface of relatively blunt contour, said inner surface converging to provide a throat of smaller diameter than and spaced rearwardly from said frontal surface, and thrust-generating means axially located within said throat; an annular extension carried by the duct, said annular extension having a relatively sharp leading edge and inner and outer surfaces extending rearwardly therefrom in diverging relation, the inlet of said extension being constricted for high speed flight conditions; and selectively operable means for axially moving said annular extension from a position adjacent said duct wherein the inner and outer surfaces of the extension are in proximity to and virtually confluent with the inner and outer surfaces of the duct and the inner surface of the extension diverges rearwardly and smoothly merges with the throat of the duct to form a continuous inner diverging passageway for high forward speed flight conditions and minimum drag to a position wherein said extension is spaced forwardly from said duct, whereby axial static thrust of said duct is increased.

9. An aircraft as stated in claim 8, the provision of radially extending inlet guide vanes pivotably mounted in the inlet end of said duct and spaced forwardly of said thrust-generating means.

References Cited in the file of this patent

UNITED STATES PATENTS

| 2,654,215 | Thompson | Oct. 6, 1953 |
| 2,939,649 | Shaw | June 7, 1960 |

FOREIGN PATENTS

| 717,760 | Great Britain | Nov. 3, 1954 |
| 522,266 | Canada | Mar. 6, 1956 |
| 1,204,525 | France | Aug. 10, 1959 |

OTHER REFERENCES

Popular Mechanics magazine (New York), June 1958 (vol. 109, No. 6, p. 129).